3,354,025
COLOR GRADATED LAMINATES
Ardashus A. Aykanian, Wilbraham, Mass., William Hing, New Hartford, N.Y., and Martin H. Wohl, Springfield, Mass., assignors to Monsanto Company, St. Louis, Mo., a corporation of Delaware
No Drawing. Filed Sept. 18, 1964, Ser. No. 397,373
6 Claims. (Cl. 161—199)

ABSTRACT OF THE DISCLOSURE

Disclosed herein are laminated panels and interlayers therefor wherein the interlayer used to bond the laminate is characterized by having a pigmented band or gradient which extends across the interlayer. This pigmented band tapers in thickness for a maximum thickness at one edge to a minimum thickness at the other edge to give a uniform color gradient.

---

The present invention relates to laminates containing pigments and methods for preparing them. More particularly, this invention relates to plastic film, useful in pellucid laminates, containing pigments.

Present day safety laminates generally comprise two or more pellucid panels with a plastic transparent layer interposed between each of the panels. The interlayer conventionally used is composed of a plasticized polyvinyl acetal resin and is generally extruded or formed into films having thicknesses of 0.015″ and greater. The most important application for laminates of this type are as windshields for automotive, military vehicles, aircraft, etc. In addition, applications are increasing in the architectural and decorative areas.

Some of the present laminates used in windshield applications are partially colored to reduce the effects of glare and heat upon the occupants of an automobile, aircraft, etc. These laminates are produced by printing a portion of the plastic interlayer with a dye which diffuses through the body of the plastic. The manufacturer attempts to obtain a smooth gradually fading effect with the dye by decreasing the concentration and quantity of dye being applied across the width of the plastic sheet. Unfortunately, the rate of dye diffusion tends to vary and the process is difficult to control resulting in laminates having somewhat irregular color gradients.

Although the use of dyes to produce a gradual fading color band serves to reduce the effects of glare and heat, it has been found that overall improvement in these properties may be obtained by the use of pigments incorporated into the body of the sheet.

Accordingly, it is the principal object of this invention to provide a plastic sheet, useful in laminates, having a color band possessing improved glare and heat-resistant properties.

Another object of the present invention is to provide a plastic sheet, useful in laminates, having a color gradient across the surface of at least part of the sheet.

Another object of the present invention is to provide a substantially transparent laminate having a color band tending to fade towards one side which has improved glare and heat resistant properties.

A further object of this invention is to provide methods and means by which to attain the preceding objects.

Other objects of this invention will in part be obvious and will in part appear hereinafter.

These and other objects are attained by uniformly dispersing a pigment in a plastic material and extruding the resulting pigmented plastic through a contoured orifice into a stream of plastic material and shaping said stream in the form of a sheet. The resultant sheet will have a pigmented plastic strip of uniform cross-section extending longitudinally along the sheet.

In operation, pigment is admixed with a plastic resin to a desired concentration and forced by means not shown through a wedge-shaped orifice into a larger stream of plastic material flowing towards a secondary extrusion section having an orifice. It is found that the geometry of the wedge of plastic is essentially unchanged as it moves within the main stream of plastic. The orifice is rectangular in shape such that a sheet is formed.

The pigmented plastic section or strip tapers away in toward the center of the sheet such that a gradient effect or gradual inwardly diminishing in color density is noted when the sheet is viewed from the top. In general, the thickness of the strip along at least one edge of the strip is less than the maximum thickness of the strip.

The above description is set forth for purposes of illustration and not for purpose of limitation.

For optimum effect, the gradient or apparent change in color density should be gradual and uniform across the surface of the sheet. This apparent change in color density will depend on the geometric configuration of the contoured pigmented plastic portion as determined by the internal extruder orifice. As previously described the shape of the internal orifice was in the form of a wedge. However, other contours or orifice configurations may be employed depending on the final gradient or apparent change in color density desired across the surface of the sheet. The change in color density is referred to as apparent since it appears this way when looking perpendicularly through the sheet. However, in this invention, the concentration of pigment within the pigmented strip is uniform throughout. The color gradient effect which is obtained is due only to the change in thickness of the strip within and across the sheet. Generally the contoured orifice is in the form of a laterally disposed slit having a width tapering towards at least one end of the slit.

Although the mainstream of the plastic, referred to above, is normally unpigmented, it is of course, possible to incorporate a different color pigment within the main stream if desired. In addition, it is also sometimes desirable to incorporate within the main plastic stream the same pigment although in a different concentration.

The gradient or change in color density obtainable in the practice of the present invention is in general more uniform and much more controllable than that previously obtainable by the use of dyes printed in varying concentrations on the surface of a plastic sheet. In addition, the absorption effect obtainable with the use of pigments as opposed to the previous dye systems is superior. Furthermore the size of the pigment particles can be controlled for optimum adsorption, light transmission and continuity of color. Most suitable are average pigment sizes less than forty microns and more preferably less than ten microns.

The pigment concentration can vary within wide limits depending on the transmission desired after lamination. To obtain the desired effect, the transmission at the darker portion of the laminate should be less than 25% and more preferably less than 10% with a minimum of about 1%. As previously indicated, the transition between the heavily pigment areas and the non-pigmented or slightly pigmented areas should be smooth and uniform resulting generally in transmissions through the transition area varying anywhere from less than 10% to less than 95%. (Transmission values determined by G.E. spectrophotometer using Illuminate A light source.)

Various types of pigments may be employed in the practice of the present invention. In general, these pigments constitute discrete particles which may be inorganic or organic materials. Typical of the pigments which may be employed are titanium dioxide, carbon black, phthalocyanine blue, ultramarine blue, medium chrome green, dark chrome green, phthalocyanine blue and green, cadmium red, molybdate orange, medium chrome yellow, light chrome yellow, alizarinemaroon, quinacridone maroons, reds and scarlets, beta-oxynapthioc reds and maroons, anthraquinone types including flavanthrone, anthanthrone and indanthrone derivatives, perinone and perylene pigments, thioindigo pigments, hansa yellows including benzidene derivatives, nickel complex-azo yellow, burnt umber (oxide brown), ferrite yellow (oxide yellow), oxide red and the like.

The plastics which are employed in the practice of this invention are thermoplastic materials which are substantially transparent and suitable as interlayers for pellucid panels. The plastic interlayer is preferably formed of synthetic resinous material such as, for example, plasticized polyvinyl acetal. However, different plastics varying in thickness and physical characteristics may be employed.

In general, the plastic sheets of the present invention are laminated between pellucid panels. These panels are usually composed of any rigid or semi-rigid material which is substantially transparent in nature. Typical of such materials are glass, synthetic plastic materials, both thermoplastic and thermoset in nature, such as polymethyl methacrylate, polystyrene, polyvinyl chloride, polypropylene, polyethylene terephthalate, cellulose acetate, cellulose nitrate and the like. Particularly preferred is glass.

The plastic sheets which are produced in the practice of this invention find their main application as interlayers for laminates. The preferred laminate construction is prepared by interposing a partially pigmented plasticized polyvinyl acetal interlayer between a pair of glass plates and then laminating by any suitable method which generally comprises subjecting the resulting assembly to a temperature of about 200 to 325° F. and a pressure of 150 to 225 p.s.i. for at least ten minutes to bond the assembly together. More detail methods may be found in U.S. Patent No. 2,290,193 and U.S. Patent No. 2,948,645. In general, the interlayer thicknesses in the architectural, decorative, automotive fields, etc. are in excess of 0.010". The laminates conventionally used for windshields of automobiles are generally bout 0.015" thick. However, laminates are being prepared for various applications where the interlayer thickness varies anywhere from 0.010" up to 0.065".

The preferred polyvinyl acetal resins may be made from various unsubstituted aldehydes or mixtures thereof. A particularly preferred acetal resin is polyvinyl butyral. In general, the acetal resin is made by reacting an aldehyde with hydrolyzed polyvinyl ester in the presence of a solvent for the product and precipitating the resin product with water. More detailed methods for preparing such resins are set forth in Morrison et al. U.S. Patent Re. 20,430, issued June 29, 1937, and Lavin et al. U.S. Patent No. 2,496,480, issued Feb. 7, 1950.

In general, the preferred polyvinyl acetal resins employed may be considered to be made up, on a weight basis, of from 5 to 25% hydroxyl groups, calculated as polyvinyl alcohol, 0 to 40% acetate groups, calculated as polyvinyl acetate, and the balance substantially acetal. When the acetal is butyral, the polyvinyl butyral resin will preferably contain, on a weight basis, from 16 to 25% hydroxyl groups, calculated as polyvinyl alcohol and from 0 to 3% acetate groups, calculated as polyvinyl acetate, the balance being substantially butyraldehyde acetal.

Any suitable plasticizer may be used in preparing the preferred polyvinyl acetal compositions useful as interlayers. In general, the plasticizers which are commonly employed are esters of a polybasic acid or a polyhydric alcohol. Among the suitable plasticizers are triethylene glycol di(2-ethyl butyrate), triethylene glycol dihexoate, glyceryl mono-oleate, dibutyl sebacate and di(beta-butoxy-ethyl) adipate, dialkyl phthalates, i.e., dioctyl phthalate, dibutoxy ethyl phthalate, etc.

The amount of plasticizer to be added to the preferred polyvinyl acetal resin may be varied within wide limits. Mixtures containing up to 100 parts of plasticizer per 100 parts of polyvinyl acetal resin may be used with satisfactory results. However, for general safety laminate use, the plasticizer content should be between 15 to 60 parts per 100 parts of polyvinyl acetal resin and more preferably 20 to 50 parts per 100 parts of polyvinyl acetal resin.

The plastic sheets of the present invention find special application in the automotive and aircraft industry as interlayers for window laminates which shield the passengers from the effects of solar light and heat while at the same time protecting the passengers against the hazards of flying objects and injury caused by bodily impact against the laminate. In addition, laminates employing these interlayers find application in the architectural and decorative areas. For example, many of the more modern building constructions feature glass laminates in windows, doors and even partitions. Furthermore, the improved ease and economics of producing these interlayers will tend to increase their usage.

It is obvious that many variations may be made in the products and processes set forth above without departing from the spirit and scope of this invention.

What is claimed is:

1. A laminated glazing unit comprising a pair of pellucid panels and an interposed plastic interlayer; said interlayer having a pigmented strip extending longitudinally along said interlayer, which pigmented strip gradually decreases in thickness from its maximum thickness towards one side of the pigmented strip, wherein the edge of the pigmented strip having the maximum thickness is substantially at one edge of the laminated glazing unit.

2. The laminated glazing unit of claim 1 wherein the pellucid panels are glass panels.

3. A laminate as in claim 1 wherein the plastic interlayer is plasticized polyvinyl butyral.

4. A laminated glazing unit as in claim 1 wherein the pigmented strip contains pigments haxing an average particle size of less than 40 microns.

5. A laminated windshield comprising a polyvinyl butyral interlayer interposed between glass sheets, wherein the polyvinyl butyral interlayer in the upper portion of the windshield is characterized by having a pigmented strip extending longitudinally along the interlayer, wherein the pigmented strip gradually decreases from a maximum thickness at the upper edge of the pigmented strip to a minimum thickness at the lower edge of the strip; wherein the edge of the pigmented strip having the maximum thickness is substantially at the top edge of the windshield.

6. A laminated windshield as in claim 1 wherein the pigmented strip contains pigments having an average particle size of less than 40 microns.

References Cited

UNITED STATES PATENTS

| | | | |
|---|---|---|---|
| 2,985,556 | 5/1961 | Rowland | 264—171 |
| 3,244,582 | 4/1966 | Kuhl | 161—199 |

MORRIS SUSSMAN, *Primary Examiner.*

ALEXANDER WYMAN, *Examiner.*

W. J. VAN BALEN, *Assistant Examiner.*